United States Patent [19]

Chefson

[11] Patent Number: 4,969,494

[45] Date of Patent: Nov. 13, 1990

[54] FILTERING DEVICE

[75] Inventor: Patrice Chefson, Elbeuf, France

[73] Assignee: Spiragaine, S.A., St. Aubin les Elbeuf, France

[21] Appl. No.: 359,284

[22] Filed: May 31, 1989

[30] Foreign Application Priority Data

Jun. 1, 1988 [FR] France .................................. 8807301

[51] Int. Cl.$^5$ ............................................. B65G 11/08
[52] U.S. Cl. ......................................... 141/93; 141/59; 141/286; 414/291
[58] Field of Search .................... 141/59, 67, 286, 290, 141/93; 414/291

[56] References Cited

U.S. PATENT DOCUMENTS

| | | | |
|---|---|---|---|
| 1,667,896 | 5/1928 | Maguire | 141/93 |
| 2,069,192 | 1/1937 | Behr et al. | 414/291 |
| 2,078,313 | 4/1937 | Briggs | 141/286 |
| 2,564,969 | 8/1951 | Goldberg | 141/67 |
| 3,306,323 | 2/1967 | Aronson | 141/286 |
| 3,707,998 | 1/1973 | Dalrymple | 141/93 |
| 3,908,720 | 9/1975 | Garnett | 141/93 |
| 4,182,591 | 1/1980 | Stanelle | 414/291 |
| 4,492,294 | 1/1985 | Ball | 141/93 X |
| 4,727,913 | 3/1988 | Bliss | 141/93 X |
| 4,821,861 | 4/1989 | Shanahan | 141/93 X |

FOREIGN PATENT DOCUMENTS

| | | | |
|---|---|---|---|
| 1034549 | 8/1989 | Fed. Rep. of Germany . | |
| 4140353 | 10/1979 | Japan | 414/291 |
| 1261872 | 10/1986 | U.S.S.R. | 414/291 |
| 1321642 | 7/1987 | U.S.S.R. | 414/291 |

Primary Examiner—Henry J. Recla
Assistant Examiner—Casey Jacyna
Attorney, Agent, or Firm—Fisher, Christen & Sabol

[57] ABSTRACT

This invention relates to a device for filtering a moving gaseous atmosphere in an installation for unloading pulverulent products in bulk, the installation being of the type constituted by a supply sleeve connecting the base of a silo or hopper to the circular filling orifice of a mobile container, wherein it is constituted by a discharge bushing extending the base of the sleeve, this bushing being engaged in the filling orifice of the container, and this bushing is associated with an outer cone concentric to said bushing and adapted to rest with self-centering on the edges of the orifice thus obturated, the cone being closed at its summit by a horizontal wall comprising an evacuation opening, and the annular space defined between the central tubular bushing and the outer cone constitutes a volume for decantation of the gaseous phase, particularly the air laden with solid particles in suspension and driven from the inner atmosphere of the container, this decantation volume communicating with the volume of the container being filled, and where the dust is developed, by a lower annular passage between the base of the outer cone and the base of the central bushing, and this decantation volume internally comprises a plurality of walls forming baffles, defining a path of the laden air between the lower inlet passage and said upper evacuation opening, comprising a plurality of changes of direction, and the inner bushing comprises openings for communication with said decantation volume, these openings cooperating with said walls forming baffles in order to allow the particles decanted in the volume and recycled with the poured materials, to be recovered.

13 Claims, 5 Drawing Sheets

FILTERING DEVICE

FIELD OF THE INVENTION

The present invention relates to a device for decanting dust within a gaseous phase evacuated from a container which is being loaded with pulverulent product.

The invention aims at equipping installations for unloading in bulk from a hopper or a silo to a mobile container or tanker, avoiding the known drawbacks of such installations, and in particular eliminating and recovering, by decantation and filtration, the dust emitted and in suspension in the gaseous phase escaping from the container being filled.

BACKGROUND OF THE INVENTION

It will be readily understood that, as the interior of the container is filled, the inner atmosphere thereof must be evacuated towards the outside, driven by the arrival of the solid products; now, this atmosphere is precisely considerably laden with dust and particles in suspension which spread spontaneously in the ambient medium.

Attempts have been made to overcome this drawback by associating the principal discharging sleeve, through which the bulk material is poured into the container, with an outer concentric sleeve defining with the first a space in the form of a cylindrical ring allowing the dust to escape from the container, said space terminating in filtration means associated with suction means.

Installations of this known type are far from being satisfactory, as they represent a complex, expensive structure whose operation is difficult to master; in fact, in order to ensure reliable efficiency of such systems, an artificial draught of the particle-laden atmosphere must be provoked, which causes a parasitic entrainment of the dispersed pulverulent products and a rapid clogging of the filters.

It is a first object of the invention to overcome this drawback by eliminating any penetration in the ambient atmosphere of particles in suspension escaping from the interior of the container being loaded.

Another object of the invention is to allow automatic, simple and reliable recovery of the particles of the pulverulent product which are recycled and return in the principal flow of the material poured.

SUMMARY OF THE INVENTION

To that end, the invention relates to a device for filtering a moving gaseous atmosphere in an installation for unloading pulverulent products in bulk, the installation being of the type constituted by a supple sleeve connecting the base of a silo or hopper to the circular filling orifice of a mobile container, said device being characterized in that it is constituted by a discharge bushing extending the base of the sleeve, this bushing being engaged in the filling orifice of the container, and this bushing is associated with an outer cone concentric to said bushing and adapted to rest with self-centering on the edges of the orifice thus obturated, the cone being closed at its summit by a horizontal wall comprising an evacuation opening, and the annular space defined between the central tubular bushing and the outer cone constitutes a volume for decantation of the gaseous phase, particularly the air laden with solid particles in suspension and driven from the inner atmosphere of the container, this decantation volume communicating with the volume of the container being filled, and where the dust is developed, by a lower annular passage between the base of the outer cone and the base of the central bushing, and this decantation volume internally comprises a plurality of walls forming baffles, defining a path of the laden air between the lower inlet passage and said upper evacuation opening, comprising a plurality of changes of direction, and the inner bushing comprises openings for communication with said decantation volume, these openings cooperating with said walls forming baffles in order to allow the particles decanted in the volume and recycled with the poured materials, to be recovered.

According to a first embodiment, the walls forming baffles are disposed helically from the annular inlet passage up to the summit of the decantation volume, this helicoidal wall joining on each side the cylindrical wall of the bushing and the wall of the outer cone, the recovery openings disposed on the bushing being located level with and immediately above the join of said helicoidal walls on the bushing.

According to a second more particular embodiment, the inner decantation volume comprises a first guiding wall in the form of a concentric truncated flange joining by its inner edge the central bushing, which comprises at the level of the join of the flange a plurality of passages for recovery of the solid particles.

Said truncated flange is advantageously associated with guiding walls disposed between said flange and the outer cone, these walls following a helicoidal path.

According to a variant embodiment of the invention, the decantation device comprises a first stage constituted by the base of the outer cone and a lower flange and a second upper decantation stage constituted by an inner cone concentric to the outer cone and disposed in the upper part of the latter, the inner cone joining at its summit the horizontal transverse wall closing the outer cone, the base of the inner cone remaining separated from the central bushing to clear an annular passage for the laden air between the lower stage of decantation and the upper stage of decantation constituted by the inner volume of the inner cone.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
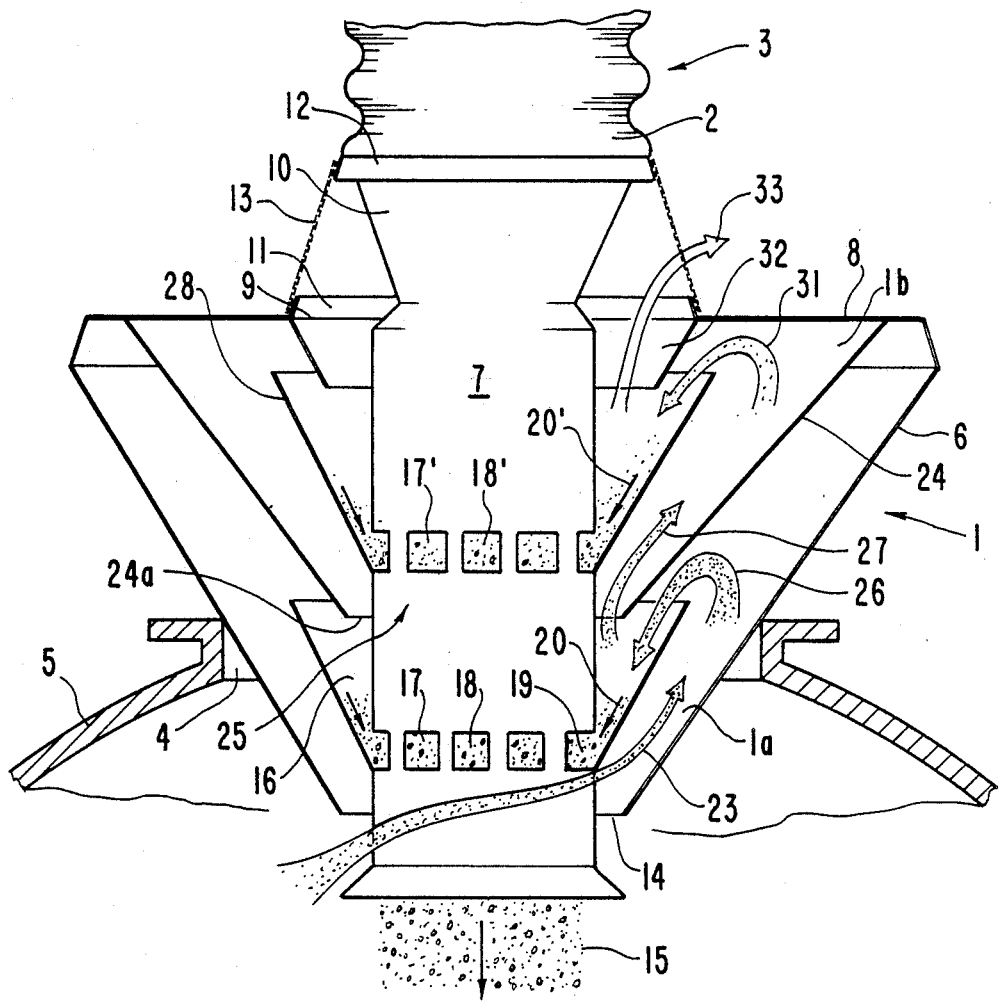
FIG. 1 shows a view in section of a first embodiment of the decantation device of the invention.
Figure 2:
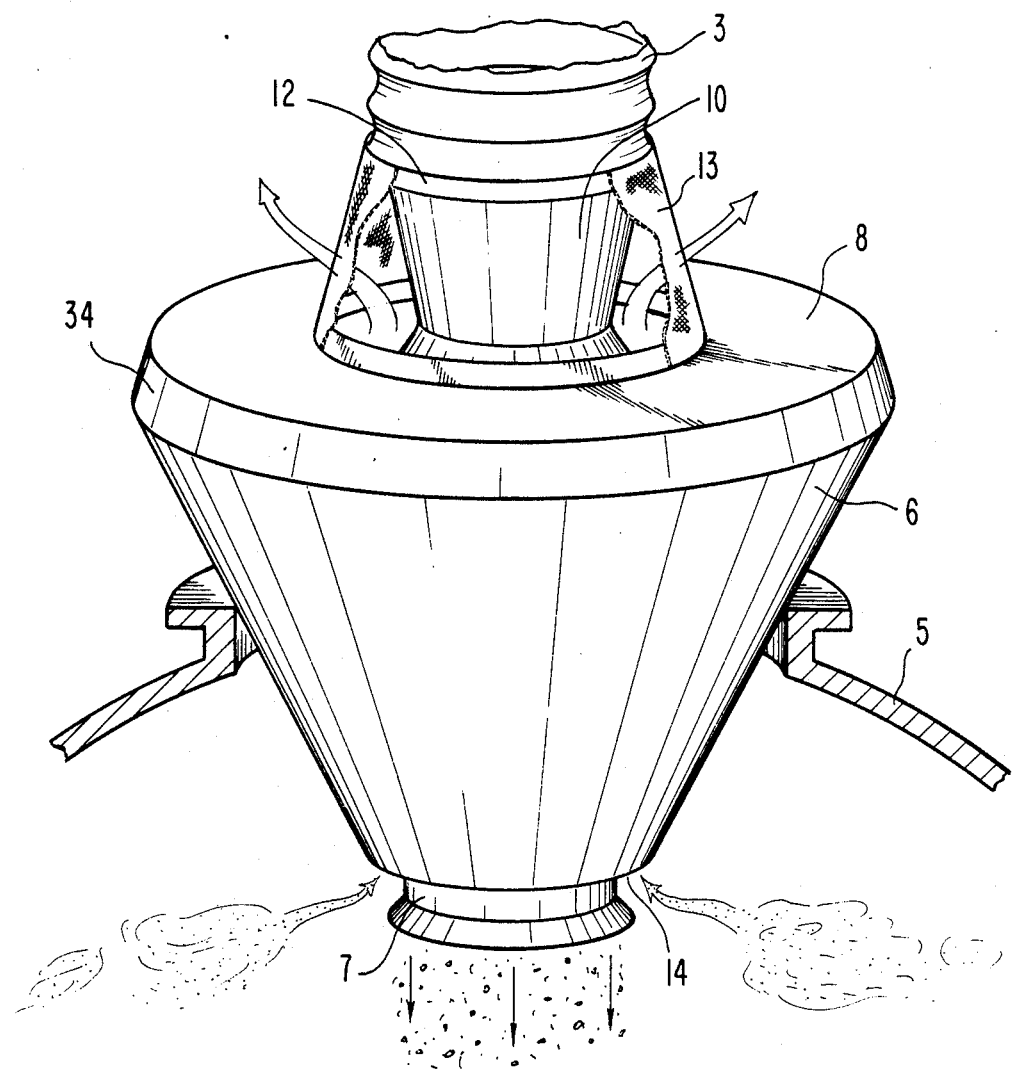
FIG. 2 shows a view in perspective of this device.
Figure 3:
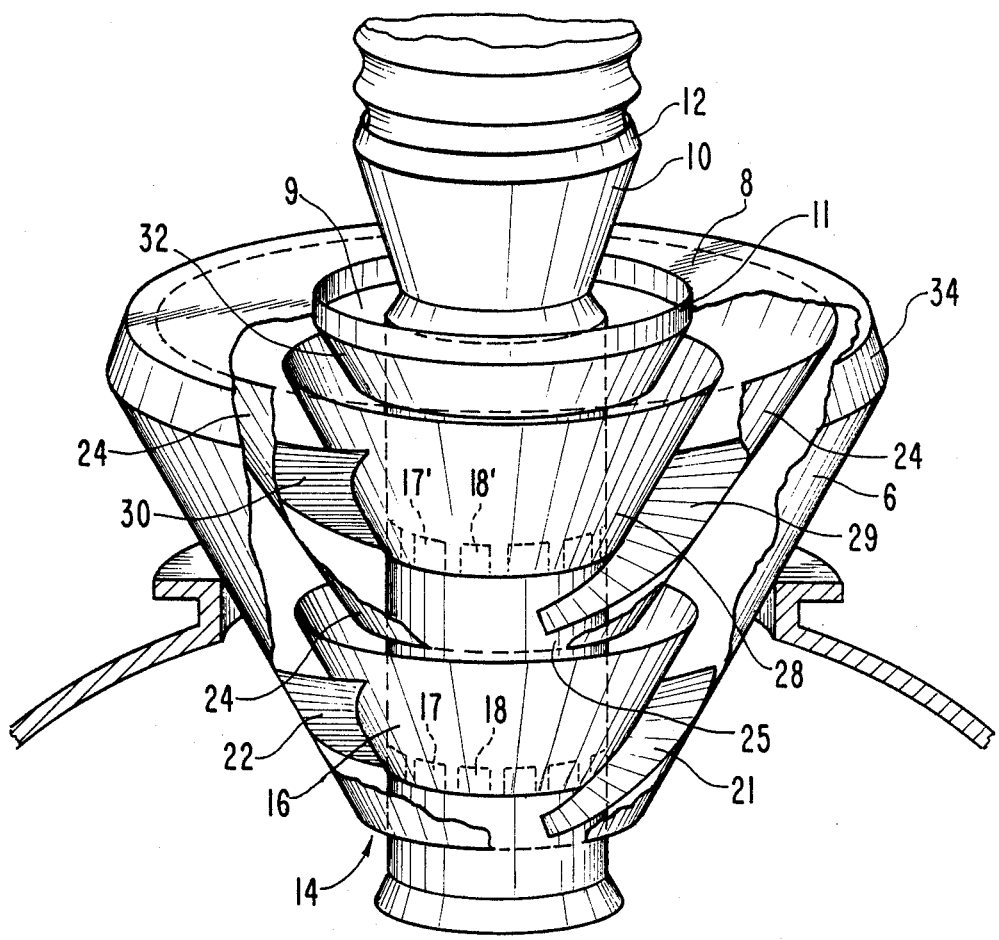
FIG. 3 is a view in perspective thereof with parts torn away, showing the inner deflecting and guiding walls.

Referring now to the drawings and firstly in connection with the first embodiment as illustrated in FIGS. 1, 2 and 3, the device according to the invention is constituted by a truncated assembly 1 which extends the base 2 of the sleeve 3 and engages in the manhole 4 in the container 5.

The decantation device comprises, inside the housing or outer cone 6, a central bushing 7 connected to the base 2 of the sleeve, the outer cone 6 being concentric to the inner bushing 7.

The cone 6 is open at its base whilst its upper plane is closed by the horizontal wall 8 in the form of a ring, this wall 8 being interrupted at a certain distance from the central concentric bushing, thus leaving between this wall and the central bushing an annular free zone 9 which constitutes the upper opening of the decantation cone 1.

It is seen that the decantation cone may thus be inserted in the manhole 4 for filling in which it is exactly positioned by self-centering thanks to its truncated shape cooperating with the circular shape of the manhole 4.

The bushing 7 is joined to the base 2 of the sleeve 3 by a narrowed zone forming funnel 10.

In fact, this zone provokes an effect of recentering of the bulk materials which are poured from the sleeve 3 (coming from the upper storage silo) and the products are thus obliged to follow the central part of the bushing, widely avoiding the walls.

As will be explained hereinbelow, this will facilitate recovery of the solids separated by gravimetric sedimentation inside the decantation cone.

A flange 11 has advantageously been provided at the level of the inner edge of the wall 8 defining the evacuation opening 9.

This flange 11 cooperates with a flange forming neck 12 disposed at the apex of the part 10 constituting a funnel; the two flanges or necks 11 and 12 disposed concentrically constituting a circular wall for bearing a filtering sheet forming belt and thus interposed between the evacuation opening 9 and the open air.

The base of the bushing 7 preferably extends below the base of the cone 6.

The annular space which separates at their respective base the cone 6 and the bushing 7 defines an annular passage 14 through which are drawn the fumes and in general the atmosphere inside the container 5 driven by the arrival of the solid materials 15 in bulk.

These fumes and gaseous phase are obviously laden with dust and particles in suspension in particular in the air.

According to the invention, the decantation cone will allow, between inlet 14 and outlet 9 for the purpose of filtration thereof by wall 13, a decantation making it possible largely to separate the solid particles which are recycled towards the interior of the bushing.

To that end, according to the invention, the interior space of the decantation cone comprises a succession of walls positioned so as to provoke an extended path with a succession of variations in direction so as to allow separation of the solids and suction thereof through recovery openings.

According to the embodiment of FIGS. 1, 2 and 3, it is seen that, at the base of bushing 7, is disposed a flange 16 which is joined at its base to the bushing and which forms a first recovery and sedimentation dish.

To that end, where the flange 16 joins the sleeve, there are provided on said sleeve openings 17, 18 which will allow the first sedimented elements 19 to return to the interior of the bushing in the direction of arrow 20.

Moreover, as shown in FIG. 3, the annular space between the flange 16 and the wall of the cone 6 comprises baffles in the form of helically disposed walls, for example three in number, such as walls 21 and 22 shown in FIG. 3.

These walls will thus guide the particle-laden airstreams in an upward path which will not be a straight line from the inlet passage 14 upwardly but which will define a helicoidal path within the annular zone separating the flange 16 from the wall of the outer cone 6; as may be seen, along the path of arrow 23 (FIG. 1).

In the example of FIGS. 1, 2 and 3, the flange 16 constitutes with the base of the cone 6 a first stage of decantation which is closed at its apex by the wall of the inner cone 24, which joins at its apex the upper horizontal wall 8, whilst its base 24a is maintained at a certain distance from the inner bushing 7, thus defining an annular passage between the lower stage of decantation and the upper stage constituted by the interior volume of the inner cone 24 and described hereinafter.

It is seen that the fact of the decantation cone 1 being composed of a first stage constituted by the volume 1a of the base of the cone 6 and a second stage 1b constituted by the interior volume of the inner cone 24, determines a 180° change in the direction of the gaseous streams represented in particular by arrow 26; the upward streams following a helicoidal path arriving at the level of the upper edge of the flange 16 must in fact redescend to find the passage constituted by the annular space 25 described hereinabove.

At the level of this first stage, the streams, following the tip of arrow 26, then follow a path which is no longer upward but downward, which allows in the dish constituted by the flange 16 a separation by gravimetric decantation of the heaviest solid particles in the direction of arrow 20, particles 19 being drawn through openings 17, 18 to join the interior space of the bushing 7.

Suction of the particles is facilitated by a "vacuum pump" effect coming from the entrainment and drop of the solid mass 15.

The upper part of the dish defined by the flange 16 therefore contains air already largely filtered and separated from its coarsest particles; this gaseous phase continues its upward path in the direction of arrow 27, penetrating in the second decantation stage.

This second stage is defined by the interior volume 1b of the inner cone 24.

This volume in turn comprises an upper flange 28 substantially of the same shape as the lower flange 16.

As in its path within the lower stage of decantation, the air streams are obliged to follow a helicoidal path due to the helical walls disposed at the level of the upper stage of decantation, such as walls 29 and 30.

By following this upward movement, the streams in the direction of arrow 31 are blocked in high position by the upper wall 8 and they must therefore follow a fresh 180 turn to penetrate in the inner space of the upper decantation dish formed by the upper flange 28.

It is seen that, there again, the particle-laden streams are obliged initially to follow a downward and centripetal path, facilitating the movement of separation of the particles entrained downwardly and following wall 28, with the result that the particles at this second upper stage of decantation are also obliged, in the direction of arrow 20', to join openings 17'-18', allowing recovery of these solid matters decanted towards the interior space of the bushing.

A deflector 32, generally truncated in shape, cooperates with flange 28 so as to oblige the air streams 31 to return towards the center and downwardly, before being able to escape through the ring-shaped space which separates the deflector 32 from the central bushing 7.

The upper space of the dish formed by the flange 28 therefore contains largely filtered air which may escape through the interior space of the deflector 32 towards the atmosphere.

Before being released into the atmosphere, the air, in the direction of arrow 33, must pass through the filtering wall 13 interposed as a peripheral belt and abutting on the edges 11 and 12 as described hereinabove.

The walls of the dishes 16 and 28, as well as of the inner cone 24 and of the outer cone 6, preferably form with the horizontal an angle greater than 45° so as to avoid any deposit and sedimentation of particles on these walls.

Moreover, the ring-shaped interstitial space between each flange 16 or 28 respectively, and the peripheral cone which surrounds it, 6 and 24 respectively, is provided so that the volume increases upwardly so as to allow a slow and regular deceleration of the streams during their helicoidal upward path.

Figure 4:
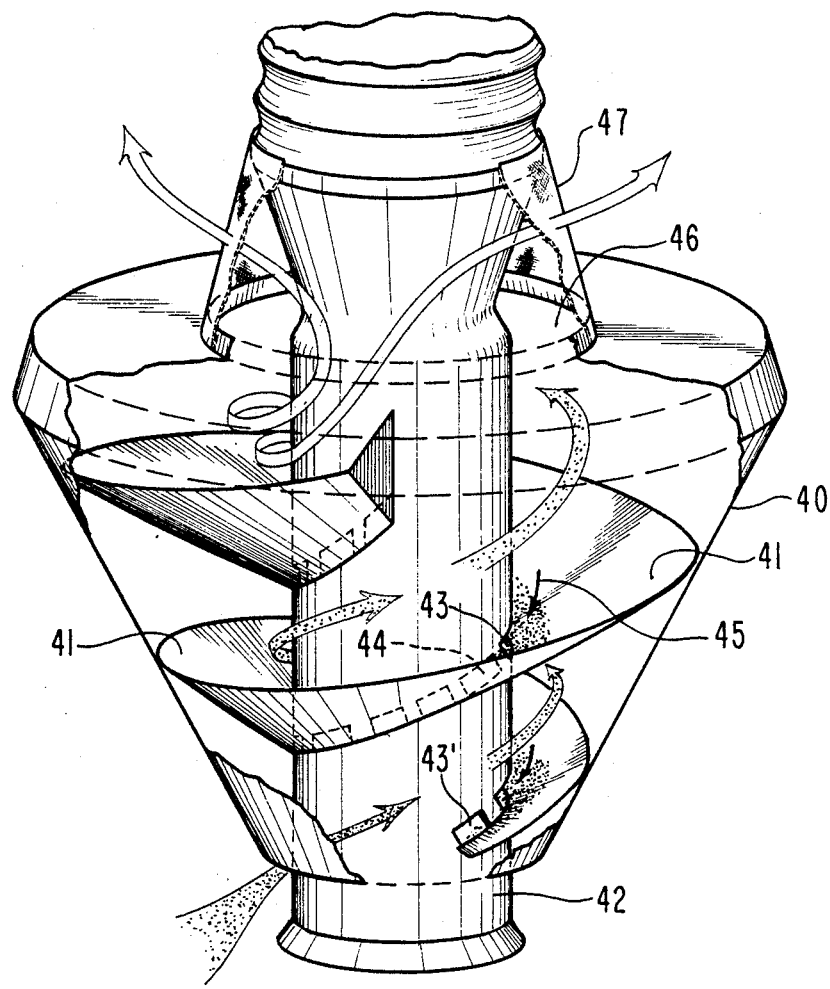
FIG. 4 shows a view with parts torn away of a second embodiment of the invention.

FIG. 4 shows a variant embodiment in which the outer cone 40 internally contains a helical wall 41 inclined from the wall of the cone 40 as far as the inner bushing 42.

Where the helicoidal wall 41 joins the central bushing 42, there is provided a succession of slots 43 and 43' and 44 which, as before, allow recovery of the sedimented particles, in the direction of arrow 45, towards the interior space of the bushing where these particles join the solids being poured.

At the end of their helicoidal path, the air streams which were laden and are now largely filtered, escape through the upper ring-shaped evacuation 46 to traverse the filtering wall 47 similar to wall 13.

It is seen that, in both cases, a particularly simple device is produced which, on the one hand, precisely obturates the filling orifice of the container and, on the other hand, prevents any evacuation of fumes or laden air towards the outside.

This laden air must necessarily pass through the passages disposed at the base of the cone. Between the upper outlet and the base of the cone which constitutes the inlet of the dusty atmosphere, there are provided static devices which are particularly efficient since they employ the ascending force and the thrust of the gases tending to escape to guide them along appropriate paths so as to effect a gravimetric separation during which the particles are obliged to join the solid phase being poured.

The largely filtered air may thus pass through the filtering wall 13 without causing rapid clogging.

As shown in the Figures, the cone 6 comprises in its upper part a bevelled flange 34 forming a hoop advantageously reinforced in one or more places to undergo the action of a mass thus creating a vibratory shock within the various inner walls, this shock allowing separation of the particles possibly deposited during the preceding operation; these particles are thus obliged either to join by gravity the interior space of the bushing (inside the flanges 16 and 28) or to follow the inner wall of the cone 6 and to join the interior volume of the container where the elements thus interior volume of the container where the elements thus sedimented may be recovered.

Figure 5:
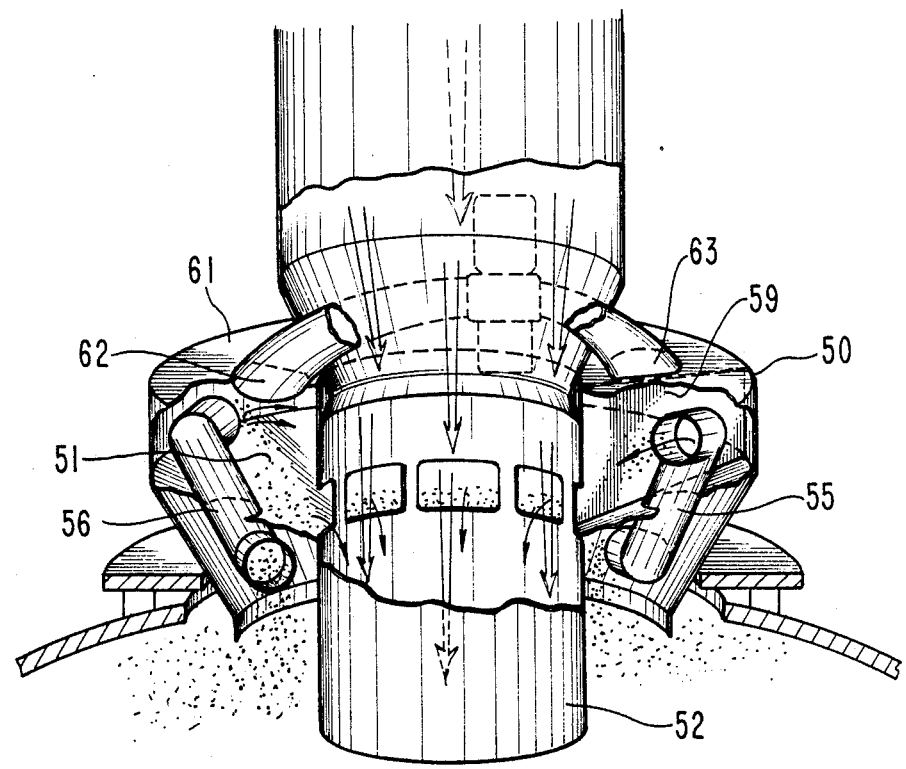
FIG. 5 and 6 show a third embodiment.
Figure 6:
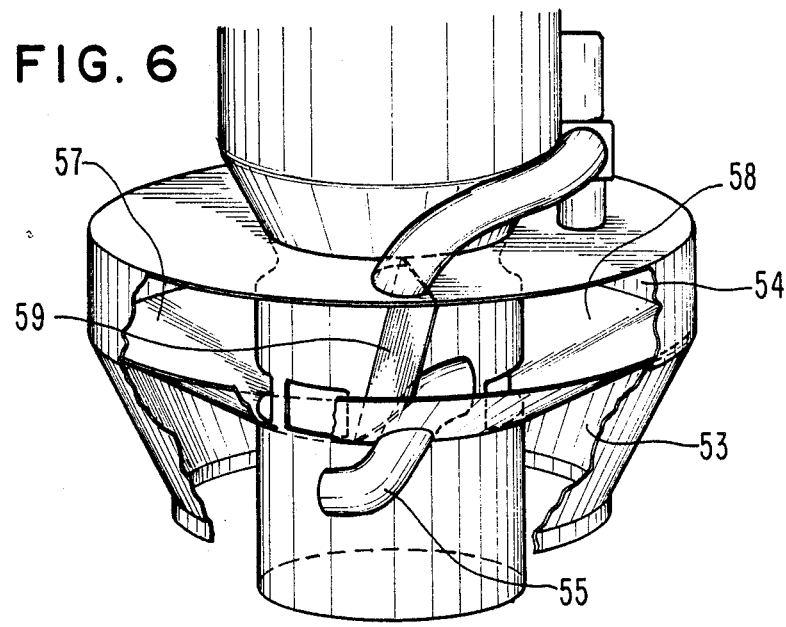

In a third embodiment, illustrated in FIGS. 5 and 6, the invention also relates to a device, wherein the cone 50 internally comprises at least one annular wall 51 joined by its periphery to said cone and by its central edge to said bushing 52, and this wall defines at least two chambers superposed to form two stages of decantation, 53 and 54 respectively, and communicating by two intermediate conduits 55, 56 in diametrically opposite positions, the upper chamber 54 being itself divided into two volumes 57, 58, each in the form of a half-ring, by two vertical, radial partitions 59, each partition being disposed immediately to the rear of the opening of one of the two conduits 55, 56, and each volume comprises on the upper horizontal wall 61 closing the apex of the cone, an opening 62, 63 for evacuation in position substantially diametrically opposite with respect to the opening of the conduit in said volume, with the result that the air penetrating in one of the two volumes of the upper stage necessarily follows a semi-circle before escaping upwardly towards a filtration and/or suction assembly.

What is claimed is:

1. A device for filtering a moving gaseous atmosphere in an installation for unloading pulverulent products in bulk, the installation being of the type constituted by a supply sleeve connecting the base of a silo or hopper to the circular filling orifice of a mobil container, wherein it is constituted by a central, tubular, discharge bushing extending the base of the sleeve, said bushing adapted to be engaged in the filling orifice of the container, and said bushing being associated with an outer cone which is concentric to said bushing and adapted to rest with self-centering on the edges of said orifice thus obturated, the cone being closed at its summit by a horizontal wall except for an annular space therein around said bushing, the annular space comprising an evacuation opening, and the annular space defined between said bushing and the outer cone constituting a volume for decantation of the gaseous phase, particularly the air laden with solid particles in suspension and driven from the inner atmosphere of the container, this decantation volume communicating with the volume of the container being filled, and where the dust is developed, by a lower annular passage between the base of the outer cone and the base of said bushing, and this decantation volume internally comprises a plurality of walls forming baffles, defining a path of the laden air between the lower inlet passage and said upper evacuation opening, comprising a plurality of changes of direction, and said bushing comprises openings for communication with said decantation volume, these openings cooperating with said walls forming baffles in order to allow the particles decanted in the volume and recycled with the poured materials, to be recovered.

2. The device of claim 1, wherein the walls forming baffles are disposed helically from the annular inlet passage up to the summit of the decantation volume, this helicoidal wall joining on each side the cylindrical wall of the bushing and the wall of the outer cone, the recovery openings disposed on the bushing being located level with and immediately above the join of said helicoidal walls on the bushing.

3. The device of claim 1, wherein the inner walls of the decantation volume define a path of the air of upwardly increasing section, thus slowing down the speed of displacement of the laden air.

4. The device of claim 1, wherein the walls are disposed at a 45° inclination with respect to the upper horizontal plane, thus avoiding any stagnation of particles possibly deposited.

5. The device of claim 1, wherein the inner decantation volume comprises a first guiding wall in the form of a concentric truncated flange joining by its inner edge the central bushing, which comprises at the level of the join of the flange a plurality of passages for recovery of the solid particles.

6. The device of claim 5, wherein said truncated flange is associated with guiding walls disposed between said flange and the outer cone, these walls following a helicoidal path.

7. The device of claim 1, wherein the device comprises a first stage constituted by the base of the outer cone and a lower flange, and a second upper decantation stage constituted by an inner cone concentric to the outer cone and dispose din the upper part of the latter, the inner cone joining at its summit the horizontal transverse wall closing the outer cone, the base of the inner cone remaining separated from said bushing to clear an annular passage for the laden air between the lower stage of decantation and the upper stage of decantation constituted by the inner volume of the inner cone.

8. The device of claim 7, wherein the base of the inner cone lies substantially at the level of and in the same plane as the upper edge of the lower flange.

9. The device of claim 7, wherein the second decantation stage constituted by the inner cone comprises a concentric, truncated upper flange joining by its inner edge the central bushing, which comprises at the level of this join a plurality of openings allowing the particle decanted from this second volume and collected by said flange to be recovered, these particles joining the flow of the poured materials.

10. The device of claim 7, wherein said second decantation stage comprises a deflector of generally circular shape and preferably truncated, of which the apex joins the upper horizontal wall closing the apex of the outer cone, said horizontal wall stopping at the level of the upper edge of this deflector to leave between this edge and the wall of said bushing, an upper annular passage for evacuating the filtered air.

11. The device of claim 10, wherein the base of this deflector lies substantially at the level of, or slightly below the plane defined by the upper edge of the upper flange inside the inner cone.

12. The device of one of claims 1 to 11, wherein the base of the discharge sleeve connected to said bushing comprises a truncated funnel for recentering the material, the base of this funnel being of diameter smaller than the diameter of said bushing, thus provoking a nozzle effect separating the poured materials from the edges of said bushing.

13. The device of claim 12 wherein the summit of the bushing above the funnel zone comprises a cylindrical neck and the upper wall of the outer cone comprises, around the annular evacuation opening, a second neck concentric to the first, the two necks cooperating to form a bearing wall receiving a filtering surface forming belt and closing the opening for the partially filtered air.

* * * * *